US008641128B2

(12) United States Patent
Edwards (10) Patent No.: US 8,641,128 B2
(45) Date of Patent: Feb. 4, 2014

(54) VEHICLE FLOOR ASSEMBLY WITH INSERT (75) Inventor: David Edwards, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 571 days.

(21) Appl. No.: 12/537,294

(22) Filed: Aug. 7, 2009

(65) Prior Publication Data

US 2011/0031776 A1 Feb. 10, 2011

(51) Int. Cl.
B62D 27/02 (2006.01)
E04C 5/16 (2006.01)

(52) U.S. Cl.
USPC .................. 296/181.3; 296/181.1; 296/35.1

(58) Field of Classification Search
USPC .............. 296/35.1, 204, 901.01, 191, 187.08, 296/181.3, 181.1, 181.2; 411/546, 193, 411/369, 427; 52/782.1, 787.12, 787.1
See application file for complete search history.

(56) References Cited

U.S. PATENT DOCUMENTS

| 1,582,094 | A | * | 4/1926 | Sweet | 411/193 |
| 3,510,916 | A | * | 5/1970 | Phelan | 425/110 |
| 3,531,850 | A | * | 10/1970 | Durand | 29/432 |
| 3,771,272 | A | * | 11/1973 | Mihaly et al. | 52/787.1 |
| 4,577,450 | A | * | 3/1986 | Large | 52/787.12 |
| 5,207,543 | A | * | 5/1993 | Kirma | 411/121 |
| 5,411,154 | A | * | 5/1995 | Vargo | 211/189 |
| 5,505,512 | A | | 4/1996 | Martindale et al. | |
| 6,394,537 | B1 | * | 5/2002 | DeRees | 296/191 |
| 6,883,859 | B2 | | 4/2005 | Edwards et al. | |
| 7,086,688 | B2 | | 8/2006 | Edwards | |
| 7,290,820 | B1 | * | 11/2007 | Smith et al. | 296/39.2 |
| 7,393,015 | B1 | * | 7/2008 | Gillespie et al. | 280/781 |
| 2002/0040554 | A1 | * | 4/2002 | Blume et al. | 49/502 |
| 2005/0057074 | A1 | * | 3/2005 | Augustine et al. | 296/183.1 |
| 2005/0105986 | A1 | | 5/2005 | Woolstencroft | |
| 2006/0171794 | A1 | * | 8/2006 | Ordonio et al. | 411/369 |

* cited by examiner

Primary Examiner — Glenn Dayoan
Assistant Examiner — Sunsurraye Westbrook
(74) Attorney, Agent, or Firm — Mark E. Duell; Emerson Thomson Bennett, LLC (57) ABSTRACT An insert that can be used support a vehicle floor if a cross member fails either mechanically or through corrosion. The insert may also be used to protect a fastener used in a vehicle floor assembly.

20 Claims, 7 Drawing Sheets

VEHICLE FLOOR ASSEMBLY WITH INSERT

I. BACKGROUND OF THE INVENTION

A. Field of Invention

This invention pertains to apparatuses and methods related to vehicle manufacturing, and more particularly to methods and apparatuses relating to the manufacture of vehicle floor assemblies.

B. Description of the Related Art

Figure 5:
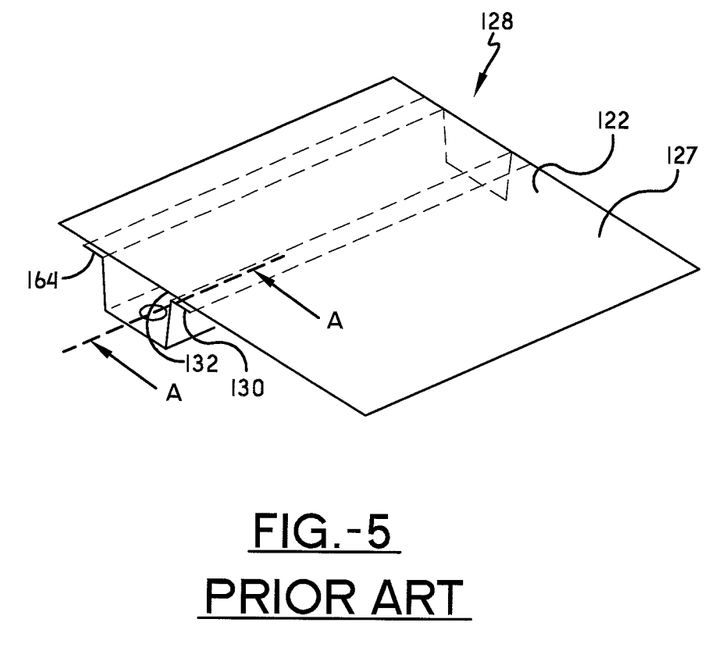
FIG. 5 is a perspective side view of a prior art floor assembly.
Figure 6:
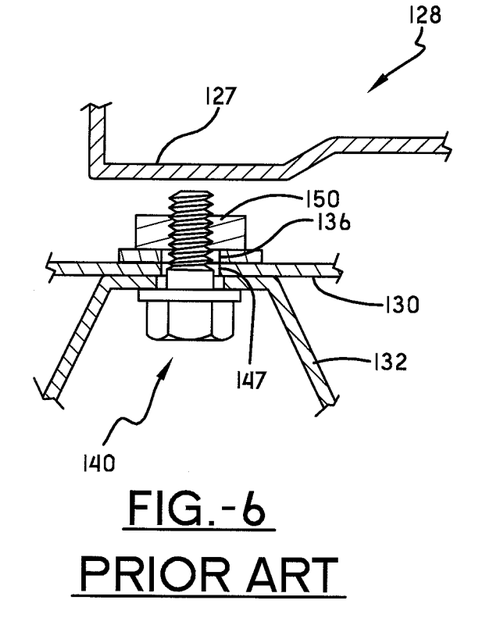
FIG. 6 is a sectional view of the prior art support assembly shown in FIG. 5.

It is known to construct a vehicle floor assembly as shown in FIGS. 5 and 6. The floor assembly 128 includes a floorboard 122 that is typically formed of a SMC (Sheet Molded Compound) and that is supported to a predetermined number of cross members 130. The cross members 130 are supported to a predetermined number of body support members 132 and the support members 132 are supported to a vehicle frame (not shown). The floorboard 122 has a cargo receiving surface 127 for use in receiving and supporting cargo. Each cross member 130 has a predetermined number of openings 136 and a predetermined number of floorboard supporting surfaces 164 that support the floorboard member 122. Each body support member 132 has a predetermined number of openings 147. Each cross member 130 is positioned such that the openings 136 in the cross member 130 are collinear with the openings 147 in the support member 132. A mechanical fastener 140, such as a bolt 148 is then inserted through each opening 147, in the support member 132 and through the corresponding opening 136 in the cross member 130. The fastener 140 is then secured in place, such as by tightening a nut 150 to the bolt 148, as shown. The floorboard 122 is then mounted to the cross members 130.

The above described floor assembly 127 works well for its intended purpose. It does have a disadvantage, however. This disadvantage is related to the fact that floor assemblies, such as may be used in a pick-up truck storage assembly, for example, are often exposed to weather conditions. While weather conditions create no problems for the SMC floorboard 122, they do create problems for the cross members 130. More specifically, moisture penetrates the floor assembly 128 subjecting the cross members 130, which is typically made of a metal, to unwanted rust and corrosion. This reduces the life of the cross members 130 and nearby components, which also are typically made of a metal.

What is needed is an apparatus and method that can support a floorboard if the cross member fails either mechanically or by corrosion.

II. SUMMARY OF THE INVENTION

According to one aspect of the present invention, a first embodiment is provided which is a vehicle comprising a frame, at least one ground engaging wheel supported to the frame, a vehicle storage assembly that is supported to the frame, the vehicle storage assembly including a floor assembly comprising (1) at least one floorboard member that has (a) a cargo side with a cargo receiving surface for use in receiving associated cargo; and, (b) a support side, (2) at least one cross member that has (a) an opening; (b) a cargo side with a floorboard supporting surface that supports at least a portion of the support side of the floorboard member and, (c) a support side, (3) at least one body support member that (a) is supported to the frame; (b) has an opening; (c) has a cargo side and, (d) has a support side, (4) at least one mechanical fastener that (a) is received within the opening in the body support member and the opening in the cross member; (b) that is used to attach the body support member to the cross member; (c) that has a cargo end that is spaced from the support side of the floorboard member when the mechanical fastener is attached to the body support member and the cross member; and, (d) that has a support end, and, (5) an insert that (a) substantially encloses the cargo side of the mechanical fastener and, (b) is positioned between the cargo side of the cross member and the support side of the floorboard member.

A different embodiment is disclosed in which at least one floorboard member that has a vehicle floor assembly comprising (1) at least one floorboard member that has (a) a cargo side with a cargo receiving surface for use in receiving associated cargo, and, (b) a support side, (2) at least one cross member that has (a) an opening; (b) a cargo side with a floorboard supporting surface that supports at least a portion of the support side of the floorboard member and, (c) a support side, (3) at least one body support member that (a) is supportable to an associated vehicle frame; (b) has an opening; (c) has a cargo side and, (d) has a support side, (4) at least one mechanical fastener that (a) is received within the opening in the body support member and the opening in the cross member; (b) that is used to attach the body support member to the cross member; (c) that has a cargo end that is spaced from the support side of the floorboard member when the mechanical fastener is attached to the body support member and the cross member; and, (d) that has a support end, and, (5) an insert that (a) substantially encloses the cargo side of the mechanical fastener and, (b) is positioned between the cargo side of the cross member and the support side of the floorboard.

In an alternative embodiment, a method is disclosed that comprises steps of (A) providing a vehicle comprising (1) a frame; and, (2) at least one ground engaging wheel supported to the frame, (B) providing a floor assembly comprising at least one body support member that (1) is supported to the frame; (2) has an opening; (3) has a cargo side; and, (4) has a support side; (C) providing a cross member that has (1) an opening; (2) a cargo side with a floorboard supporting surface; and, (3) a support side, (D) positioning the cross member so that the opening in the cross member is substantially collinear with the opening in the body support member, (E) inserting at least one mechanical fastener within the opening in the cross member and the opening in the body support member, (F) fastening the mechanical fastener to attach the cross member to the body support member, (G) substantially enclosing the cargo side of the mechanical fastener with an insert, (H) providing at least one floorboard member that has (1) a cargo side with a cargo receiving surface for use in receiving associated cargo and, (2) a support side and, (I) positioning the floorboard member so that (1) the support side of the floorboard member contacts the floorboard supporting surface of the cross member and, (2) the insert is positioned substantially between the support side of the floorboard member and the cargo side of the cross member.

One advantage of this invention is that the vehicle floor assembly, such as a truck bed, is still supported even if the cross member fails mechanically or by corrosion.

Another advantage of this invention is that fasteners and nearby components used in a vehicle floor assembly can be protected from moisture and debris.

Yet another advantage of the invention is that an insert can be easily and accurately positioned to protect a fastener.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
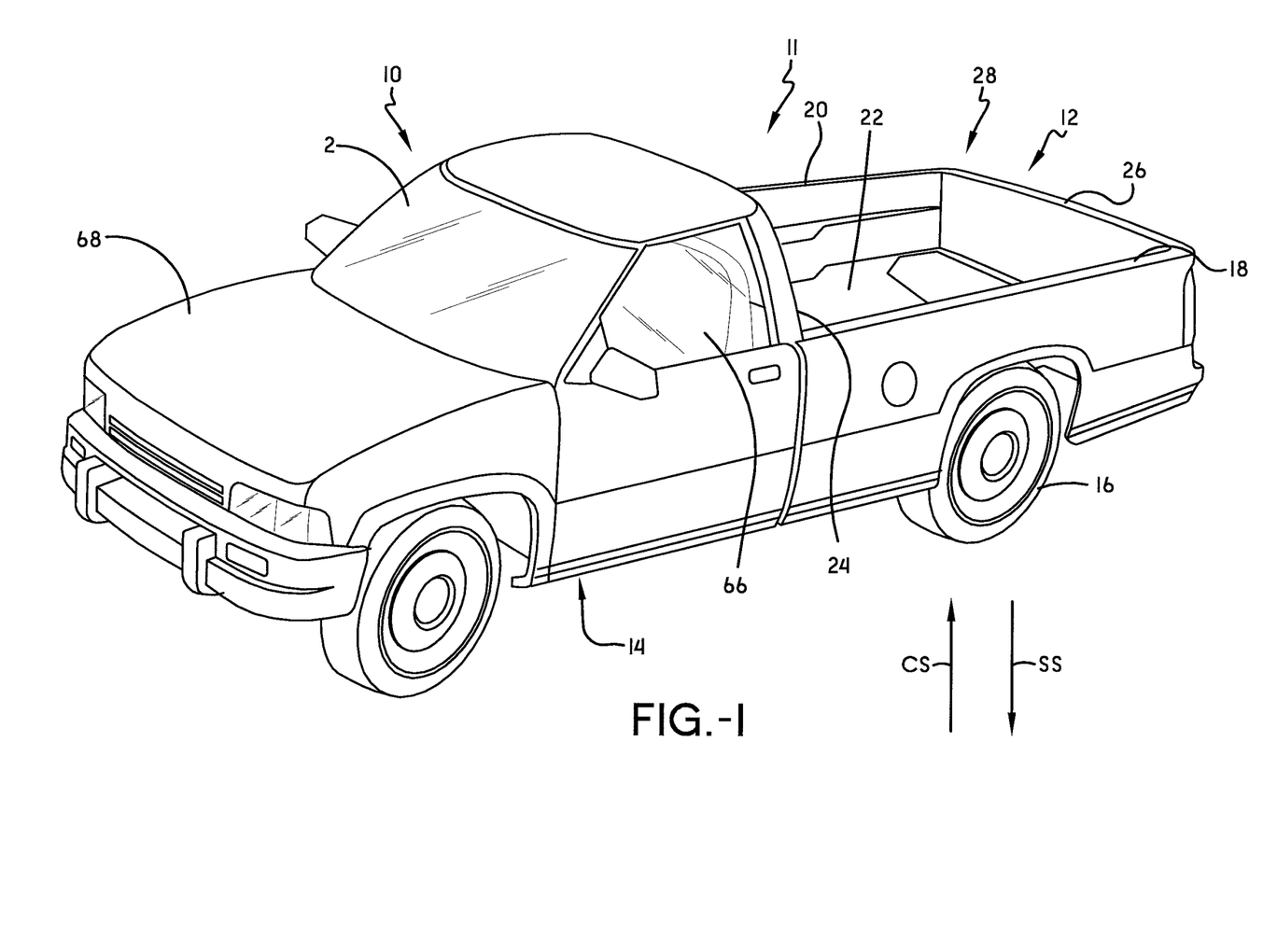
FIG. 1 is a front perspective view of a vehicle having a floor assembly according to one embodiment of this invention.

Referring now to the drawings wherein the showings are for purposes of illustrating embodiments of the invention only and not for purposes of limiting the same, FIG. 1 shows a vehicle 10 that may include a floor assembly 28 according to this invention. While the vehicle 10 shown is a pick-up truck, it is to be understood that the floor assembly 28 of this invention will work with any vehicle including, for some non-limiting examples, any modern mode of transportation or vehicle, including automobiles, trucks, trailers, aircraft or sea-faring vessels. The vehicle 10 may include a frame 14 one or more ground engaging wheels 16 supported to the frame 14, and seating 66 for at least one occupant mounted to the frame 14. The vehicle 10 may also include a locomotion source 68. The locomotion source could be of any type chosen with the sound judgment of a person of skill in the art including, for some non-limiting examples, an internal combustion engine (ICE), an electric motor, and so called "hybrids" which combine an ICE with an electric motor. The vehicle 10 may also include a passenger compartment 2, supported to the frame 14, for use in housing one or more passengers as is well known in the art.

With continuing reference to FIG. 1, the vehicle 10 may also have a vehicle storage assembly that is supported to the frame 14 as will be discussed further below. The vehicle storage assembly 11 may include the floor assembly 28 as well as other optional components. In one embodiment, the storage assembly 11 may include a pair of side walls 18, 20. In another embodiment, storage assembly 11 may include a tailgate 26 and a headboard 24. In yet another embodiment, the vehicle storage assembly 11 may not have any side walls, any tailgate or any headboard. In still another embodiment, the vehicle storage assembly 11 may include a roof or ceiling (not shown).

With reference now to FIGS. 1-3A, note that throughout this patent the term "cargo side" shall refer to direction CS (toward the cargo) and the term "support side" shall refer to direction SS (away from the cargo and toward the support). These terms are not used to limit this invention in any way but only to provide a direction reference. The floor assembly 28, which is supported to the frame 14, may include any number and type of components chosen with the judgment of a person of skill in the art. For the embodiment shown, the floor assembly 28 includes at least one floorboard member 22. Each floorboard member 22 has a cargo side 25 with a cargo receiving surface 27 for use in receiving associated cargo and a support side 23. Each floorboard member 22 may be made of any material chosen with the sound judgment of a person of skill in the art including, for some non-limiting examples, steel, aluminum, plastic, fiberglass, composites, and/or a combination thereof. The cargo receiving surface 27 may be horizontally oriented as shown in FIG. 1. In one embodiment, each floorboard member 22 is formed of a SMC (Sheet Molded Compound). SMC is a fiber glass reinforced thermosetting compound in sheet form, usually rolled into coils interleaved with plastic film to prevent auto-adhesion. Made by dispensing mixed resin, fillers, maturation agent, catalyst and mold release agent onto two moving sheets of polyethylene film. The lower sheet may contain chopped glass roving or glass mat. SMC can be molded into complex shapes with little scrap. The SMC can be manufactured into the shape required by a manufacturer for a vehicle floorboard member. The SMC floorboard member may provide a longer lifetime, greater durability and a cost savings that other materials may not be able to provide.

Figure 2:
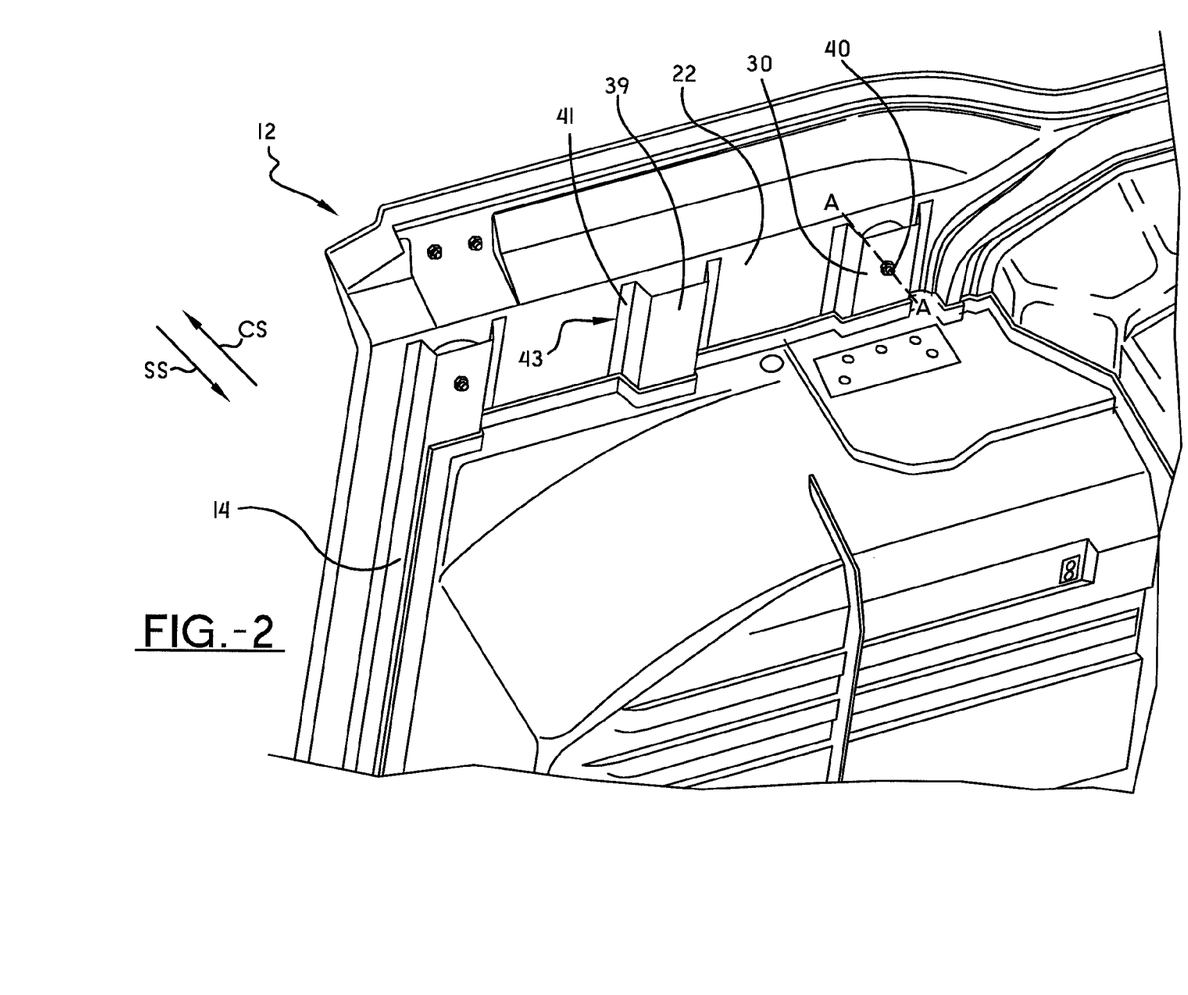
FIG. 2 is a partial bottom perspective view showing selected components of the floor assembly used with the vehicle of FIG. 1, with the body support member removed for clarity.
Figure 3:
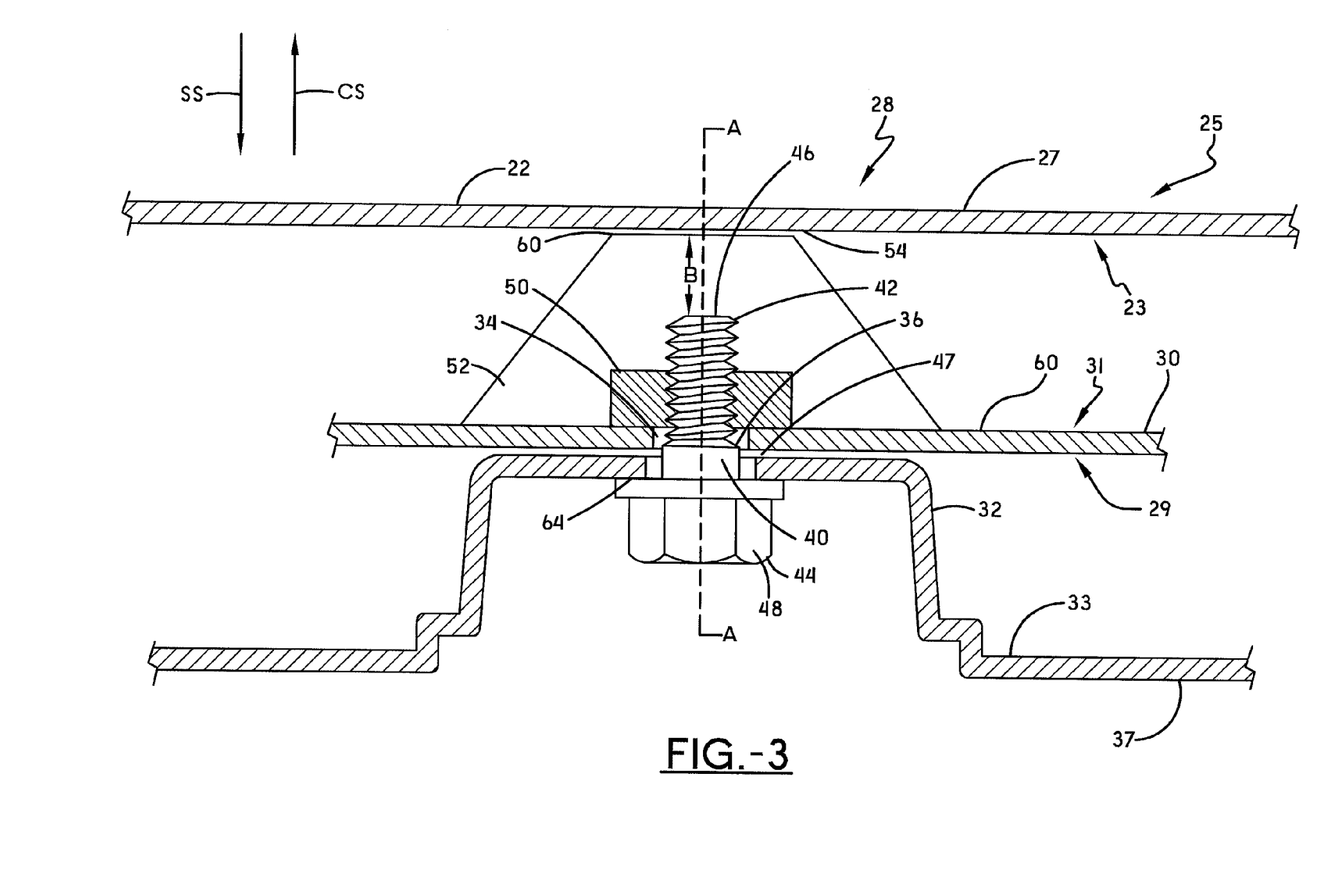
FIG. 3 is a cross-sectional view along line A-A in FIG. 2 but with the body support member added, showing a mechanical fastener and insert.

With continuing reference to FIGS. 1-3, each floorboard member 22 may be supported to one or more cross members 30, each having a cargo side 31 and a support side 29. The cross members 30 may be sized and shaped in any manner chosen with the sound judgment of a person of skill in the art. For the embodiment shown, however, each cross member 30 has a substantially U-shaped cross section with a mid-portion 39 and a pair of flanges 41. Each flange 41 may have a distal end with a floorboard supporting surface 43, on the cargo side 31 that supports the support side 29 of the floorboard member 22. For the embodiment shown, the floorboard supporting surfaces 43 are substantially planar and are substantially parallel to the support side of the floorboard member 22. Each cross member 30 may have one or more openings 38 along their length that, in one embodiment, are formed in the mid-portion 39. The cross member openings may have an axis AO1 that is substantially perpendicular to the cargo receiving surface, as shown in FIG. 3.

Still referring to FIGS. 1-3, each cross member 30 may be supported to one or more body support members 32, each having a cargo side 37 and a support side 33. The body support members 32 may be supported to the frame 14 in any manner chosen with the sound judgment of a person of skill in the art. Similarly, any number, shape and style of body support members 32 may be used with this invention when chosen with the sound judgment of a person of skill in the art. The body support members 32 may have one or more openings 47 along their length, as shown. The body support member openings may have an axis AO2 that is substantially perpendicular to the cargo receiving surface, as shown in FIG. 3. The axis AO2 may be collinear with axis AO1, as shown.

With continuing reference to FIGS. 1-3, to assemble the floor assembly 28, each cross member 30 is positioned such that the openings 36 in the cross member 30 are collinear with corresponding openings 47 in the support member 32. A mechanical fastener 40, 15 such as a bolt 48 is then inserted through openings 47 in the support member 32 and through the corresponding opening 36 in the cross member 30. The fastener 40 is then secured in place, such as by tightening a nut 50 to threads 42 formed on the bolt 48, as shown. An insert 52, which will be described further below, may then be positioned between the cargo side 31 of the cross member 30 and the support side 23 of the floorboard member 22, and fully beneath the support side 23 of the floorboard member 22, to substantially enclose the 20 cargo side or end 46 of the fastener 40. The floorboard member 22 is then mounted to the cross members 30 by placing the support side of the floorboard member 22 onto the floorboard supporting surfaces 43. Note that, for the embodiment shown, there is a distance B between the cargo end 46 of the bolt 48 and the support side 23 of the floorboard member 22. In another embodiment, the insert 52 may not contact the support side 23 of the floorboard member 22.

Figure 3A:
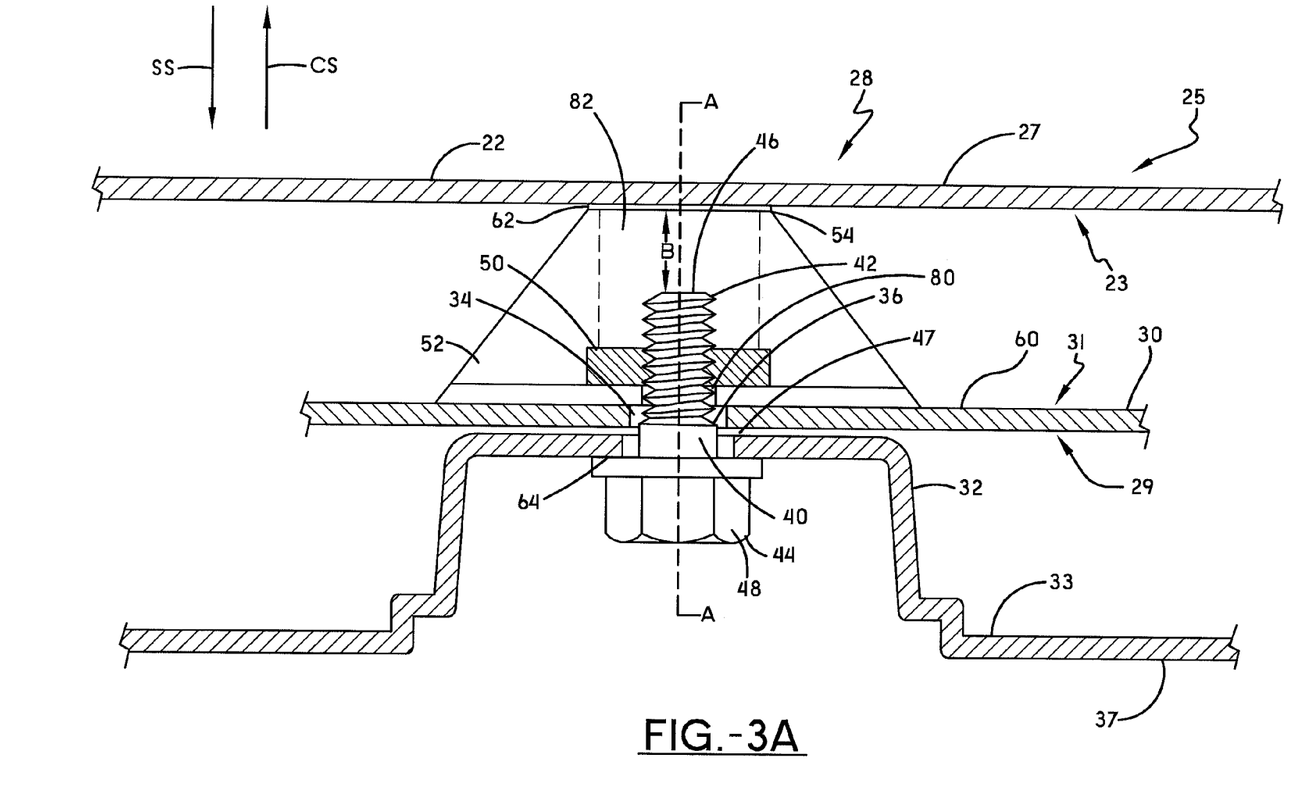
FIG. 3A is a view similar to that shown in FIG. 3 but illustrating an alternative embodiment of the insert.

With reference now to FIGS. 1-3A and 4A-4F, the insert 52 will now be described in more detail. The insert 52, when positioned as shown, protects the fastener 40 and nearby components from moisture and debris. The insert 52 may be positioned with respect to the fastener 40 in any manner chosen with the sound judgment of a person of skill in the art. In one embodiment, the insert 52 has cavity 70 that receives the cargo end 46 of the fastener 40. As shown in FIG. 3A, an attachment plate 72, on the support end 60 of the insert 52, may have an opening 74 as shown. Additionally, the insert 52 may have a support side opening 80 and a cargo side opening 82. In this way the nut 50 can be inserted from the cargo side 54 of the insert 52 and when tightened to the bolt 48, secures the attachment plate 72, and thus the insert 52, in position over the fastener 40. In another embodiment, the insert 52 may not have an attachment plate 72 on the support side 60, as shown in FIG. 3. Thus, the nut 50 may be tightened to the bolt 48 and then the insert 52 may cover the cargo side 46 of the fastener 40. In another embodiment, the cargo end 54 of the insert 52 extends in the cargo side CS direction at least beyond the cargo end 46 of the fastener 40 to improve the protection provided by the insert 52. In a specific embodiment, the cargo end 54 of the insert 52 contacts the support side 23 of the floorboard member 22, shown by distance B. In a more specific embodiment, an adhesive 62 may be applied to the cargo end 54 of the insert 52 so that the insert 52 adheres to the floorboard member 22. Though not required, another attachment plate 72a may be positioned on the cargo end 54 of the insert 52 and the adhesive 62 may be applied to the outer surface of the cargo end of the attachment plate 72a. The adhesive 62 used may be of any type chosen with the sound judgment of a person of skill in the art.

Figure 4A:
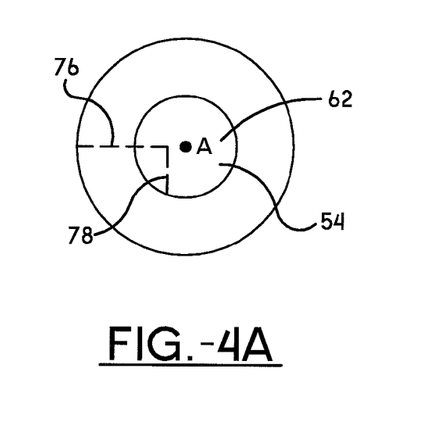
FIG. 4A is a top view of the insert shown in FIG. 3 according to one embodiment of this invention.
Figure 4B:
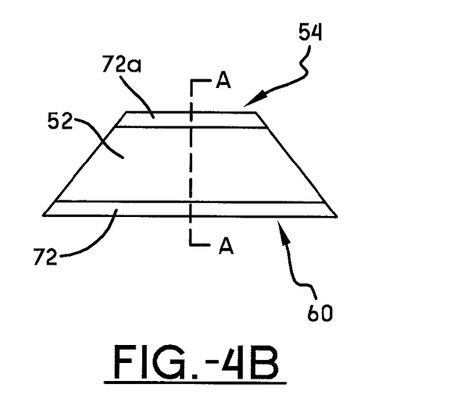
FIG. 4B is a side view of the insert shown in FIG. 3.
Figure 4C:
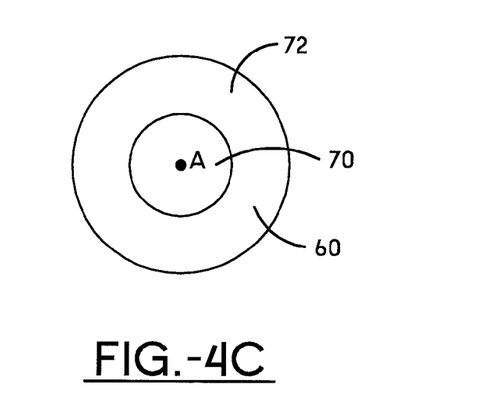
FIG. 4C is a bottom view of the insert shown in FIG. 3.
Figure 4D:
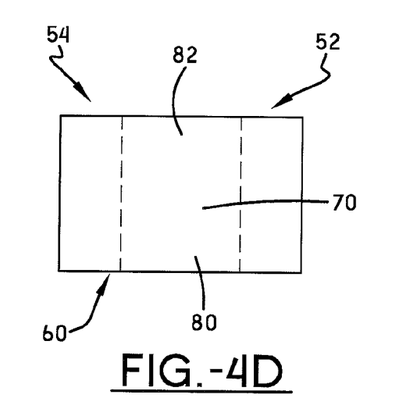
FIG. 4D is a side perspective view of an insert according to one embodiment of this invention.
Figure 4E:
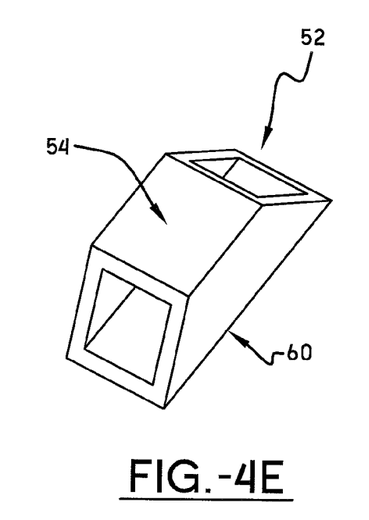
FIG. 4E is a perspective view of an insert according to one embodiment of this invention.
Figure 4F:
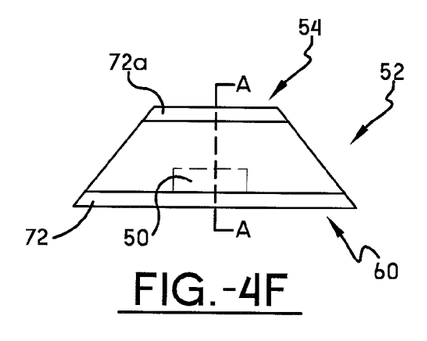
FIG. 4F is a side view of the insert according to one embodiment of this invention.

With continuing reference to FIGS. 1-3 and 4A-4F, the insert 52 may be shaped in any manner chosen with the sound judgment of a person of skill in the art. For example, the radius 76 of the support side 60 may be larger than the radius 78 of the cargo side 54. In one embodiment, the cargo side 54 of the insert 52 may be a flat surface so as to provide an application point for the adhesive 62. On the support side 60, and illustrated in FIG. 4C, the insert 52 has a cavity 70 that may have the approximate dimensions of the cargo side 46 of the fastener 40. This cavity 70 allows the support side 60 of the insert 52 to lay flush with the cross member 30, and also contacting the floorboard member 22 with the cargo side 54 of the insert 52. With reference to FIGS. 4A, 4C, and line A-A, the insert 52 may have a round or circular shape. In another embodiment, the insert 52 may be square or rectangular in shape or any other shape chosen with the sound judgment of a person of skill in the art. In a more specific embodiment shown in FIG. 4E, the insert 52 is formed from square tubing or bar stock with each of the ends having a square or angled shape, as shown. The support side 60 of the insert 52 shown in FIG. 4E could have threads sized to fit bolt 48, or the support side 60 could have an opening sized to receive fastener 40.

With reference to all the FIGURES, a method for constructing a vehicle floor assembly 28 may begin by aligning the opening 36 of the cross member 30 such that the opening 47 of the support member 32 and the insert support side opening 80 are collinear. In other words, the cargo side 37 of the support member 32 should contact the support side 29 of the cross member 30 at the openings 36 and 47 and the support side 60 of the insert 52 should contact the cargo side 31 of the cross member 30. Once aligned correctly, the fastener 40 may pass through the cross member 30, support member 32 and insert 52. With reference to FIG. 3A, a nut 50 may be inserted through the cargo side opening 82 of the insert 52 and used to secure the connection between the cross member 30, support member 32 and insert 52 via the fastener 40. In another embodiment, prior to the insert 52 being aligned with the cross member 30 and the support member 32, adhesive 62 may be used to 62 may be used to coat the support side 60 of the insert 52 which is then used to bond to the cargo side 31 of the cross member 30. After the nut 50 has been tightened, the floorboard member 22 may then be mounted onto the cargo side 54 of the insert 52 to create the storage assembly 11.

In another embodiment, and with reference to FIG. 3, the method for constructing a vehicle floor assembly 28 may begin by aligning the opening 36 of the cross member 30 such that the opening 47 of the support member 32 are collinear. In other words, the cargo side 37 of the support member 32 should contact the support side 29 of the cross member 30 at the openings 36 and 47. Once aligned correctly, the fastener 40 may pass through the cross member 30 and support member 32. With reference to FIG. 3, a nut 50 may be used to fasten the cross member 30 to the support member 32 via the fastener 40. After the nut 50 has been properly tightened, the insert 52 may be mounted over the mechanical fastener 40 between the cross member 30 and the body support member 32. Thus, the support side 60 of the insert 52 may be mounted over the cargo side 56 of the mechanical fastener 40. Prior to the insert 52 being properly mounted, adhesive 62 may be used to coat the support side 60 of the insert 52 which is then used to bond to the cargo side 31 of the cross member 30. As the insert 52 is mounted in place over the mechanical fastener 40, the floorboard member 22 may then be mounted onto the cargo side 54 of the insert 52 to create the storage assembly 11.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:

1. A vehicle comprising:
    a frame;
    at least one ground engaging wheel supported to the frame;
    a vehicle storage assembly that is supported to the frame, the vehicle storage assembly including a floor assembly comprising:
    (1) at least one floorboard member that has: (a) a cargo side with a substantially horizontal cargo receiving surface for use in receiving associated cargo; and, (b) a support side;
    (2) at least one cross member that has: (a) an opening having an axis that is substantially perpendicular to the cargo receiving surface; (b) a cargo side with a floorboard supporting surface that supports at least a portion of the support side of the floorboard member; and, (c) a support side;

(3) at least one body support member that: (a) is supported to the frame; (b) has an opening having an axis that is substantially perpendicular to the cargo receiving surface; (c) has a cargo side; and, (d) has a support side;

(4) at least one mechanical fastener that: (a) is received within the opening in the body support member and the opening in the cross member; (b) that is used to attach the body support member to the cross member; (c) that has a cargo end that is spaced from the support side of the floorboard member when the mechanical fastener is attached to the body support member and the cross member; (d) that has a support end; and, (e) has a longitudinal axis that is substantially perpendicular to the cargo receiving surface; and, (5) an insert that: (a) substantially encloses the cargo side of the mechanical fastener;

and, (b) is positioned between the cargo side of the cross member and the support side of the floorboard member and fully beneath the support side of the floorboard member.

2. The vehicle of claim 1 wherein the insert has a cargo side that contacts the support side of the floorboard member.

3. The vehicle of claim 2 wherein an adhesive attaches the cargo side of the insert to the support side of the floorboard member.

4. The vehicle of claim 1 wherein the floorboard member is formed of sheet molded compound.

5. The vehicle of claim 1 wherein the insert comprises:
a substantially tubular member having a first side and a second side;
wherein the first side contacts the support side of the floorboard member, and the second side contacts the cargo side of the cross member; and
wherein the second side has an opening sized to receive at least a portion of the mechanical fastener.

6. The vehicle of claim 1 wherein the insert comprises:
an attachment plate on the support side of the insert having a support side opening in the attachment plate;
an opening in the cargo side of the insert.

7. A vehicle floor assembly comprising:
(1) at least one floorboard member that has: (a) a cargo side with a substantially horizontal cargo receiving surface for use in receiving associated cargo; and, (b) a support side;
(2) at least one cross member that has: (a) an opening having an axis that is substantially perpendicular to the cargo receiving surface; (b) a cargo side with a floorboard supporting surface that supports at least a portion of the support side of the floorboard member; and, (c) a support side;
(3) at least one body support member that: (a) is supportable to an associated vehicle frame; (b) has an opening having an axis that is substantially perpendicular to the cargo receiving surface; (c) has a cargo side; and, (d) has a support side;
(4) at least one mechanical fastener that: (a) is received within the opening in the body support member and the opening in the cross member; (b) that is used to attach the body support member to the cross member; (c) that has a cargo end that is spaced from the support side of the floorboard member when the mechanical fastener is attached to the body support member and the cross member; (d) that has a support end; and, (e) has a longitudinal axis that is substantially perpendicular to the cargo receiving surface; and, (5) an insert that: (a) substantially encloses the cargo side of the mechanical fastener; and, (b) is positioned between the cargo side of the cross member and the support side of the floorboard and fully beneath the support side of the floorboard member.

8. The vehicle floor assembly of claim 7 wherein the insert has a cargo side that contacts the support side of the floorboard member.

9. The vehicle floor assembly of claim 8 wherein an adhesive attaches the cargo side of the insert to the support side of the floorboard member.

10. The vehicle floor assembly of claim 7 wherein the floorboard member is formed of sheet molded compound.

11. The vehicle floor assembly of claim 7 wherein the insert comprises:
a substantially tubular member having a first side and a second side;
wherein the first side contacts the support side of the floorboard member, and the second side contacts the cargo side of the cross member; and
wherein the second side has an opening sized to receive at least a portion of the mechanical fastener.

12. The vehicle floor assembly of claim 7 wherein the insert comprises:
an attachment plate on the support side of the insert having a support side opening in the attachment plate;
an opening in the cargo side of the insert.

13. A method comprising the steps of:
(A) providing a vehicle comprising: (1) a frame; and, (2) at least one ground engaging wheel supported to the frame;
(B) providing a floor assembly comprising at least one body support member that: (1) is supported to the frame; (2) has an opening; (3) has a cargo side; and, (4) has a support side;
(C) providing a cross member that has: (1) an opening; (2) a cargo side with a floorboard supporting surface; and, (3) a support side;
(D) positioning the cross member so that the opening in the cross member is substantially collinear with the opening in the body support member;
(E) inserting at least one mechanical fastener within the opening in the cross member and the opening in the body support member;
(F) fastening the mechanical fastener to attach the cross member to the body support member;
(G) substantially enclosing the cargo side of the mechanical fastener with an insert;
(H) providing at least one floorboard member that has: (1) a cargo side with a cargo receiving surface for use in receiving associated cargo; and, (2) a support side; and,
(I) positioning the floorboard member so that: (1) the support side of the floorboard member contacts the floorboard supporting surface of the cross member; (2) the cargo receiving surface is oriented substantially horizontally; (3) the opening in the body support member has an axis that is substantially perpendicular to the cargo receiving surface; (4) the opening in the cross member has an axis that is substantially perpendicular to the cargo receiving surface; (5) the mechanical fastener has a longitudinal axis that is substantially perpendicular to the cargo receiving surface; and; (5) the insert is positioned substantially between the support side of the floorboard member and the cargo side of the cross member and fully beneath the support side of the floorboard member.

14. The method of claim 13 wherein step (I) comprises the step of:
    maintaining a cargo side of the insert in contact with the support side of the floorboard member.

15. The method of claim 14 wherein step (I) comprises the step of:
    adhering the cargo side of the insert to the support side of the floorboard member.

16. The method of claim 13 wherein step (H) comprises the step of:
    providing the floorboard member formed of sheet molded compound.

17. The method of claim 13 wherein:
    step (E) comprises the step of: inserting a bolt through the opening in the body support member and the opening in the cross member; and,
    step (F) comprises the step of: tightening a nut to the bolt.

18. The method of claim 17 wherein:
    step (G) comprises the step of: substantially enclosing the nut with the insert.

19. The method of claim 13 wherein following step (D) comprises the steps of:

(E) positioning an insert so that a support side opening in the insert is substantially collinear with the openings in the cross member and body support member;
    (F) inserting at least one mechanical fastener within the openings in the cross member, body support member and through the support side opening of the insert;
    (G) fastening the mechanical fastener to attach the cross member and the body support member to the insert;
    (H) providing at least one floorboard member that has: (1) a cargo side with a cargo receiving surface for use in receiving associated cargo; and, (2) a support side; and,
    (I) positioning the floorboard member so that: (1) the support side of the floorboard member contacts the floorboard supporting surface of the cross member; and, (2) the insert is positioned substantially between the support side of the floorboard member and the cargo side of the cross member.

20. The method of claim 19 wherein:
    step (E) comprises the step of: inserting a bolt through the openings in the body support member, cross member and insert; and,
    step (F) comprises the step of: tightening a nut to the bolt.

* * * * *